United States Patent Office 2,866,793
Patented Dec. 30, 1958

2,866,793

DIHYDROXYBIFURANDIONES AND PREPARATION THEREOF

Howard E. Holmquist, Wilmington, Del., assignor to E. I. du Pont de Nemours and Company, Wilmington, Del., a corporation of Delaware No Drawing. Application August 28, 1956
Serial No. 606,562

6 Claims. (Cl. 260—343.6)

This invention relates to new compositions of matter and to a method for their preparation. More particularly this invention relates to new dihydroxybifurandiones and to a novel process for their preparation.

Condensation polymers have attained considerable commercial importance and there is therefore a continuing research interest in finding new intermediates which either reduce costs or else yield products possessing unique and distinctive properties or do both. One of the most significant advances toward the attainment of these objectives has been made by J. C. Sauer in making accessible a new family of dilactones from acetylene and carbon monoxide. These dilactones, which are described and claimed in the copending patent application of J. C. Sauer, Ser. No. 549,155, now U. S. Patent No. 2,840,570, filed November 25, 1955, as a continuation-in-part of Ser. No. 432,599, filed May 26, 1954, now abandoned, correspond to the formula $C_8(RR')_2O_4$ wherein R and R' are hydrogen, haloaryl, alkoxyaryl, or hydrocarbon radicals free from non-aromatic unsaturation, show strong lines in the ultraviolet spectra in the region of 3300–4400 A., and yield suberic acids on hydrogenation in acetic acid, using a platinum catalyst.

These dilactones of the formula $C_8(RR')_2O_4$ have been found to be highly versatile chemical compounds. Thus, they can be hydrogenated, depending on the type of catalyst and conditions, either to 1,8-octanediols and 1,8-octanedioic acids, as described and claimed in my copending patent application Ser. No. 579,459, filed April 20, 1956 as a continuation-in-part of Ser. No. 488,991, filed February 17, 1955, now abandoned, or to gamma-(gamma-carbalkoxypropyl)butyrolactones as described and claimed in my copending patent application Ser. No. 592,738, filed June 21, 1956, or to gamma-(delta-hydroxybutyl)butyrolactones as described and claimed in my copending patent application Ser. No. 583,941, filed May 10, 1956, or to 1,4,5,8-octanetetrols as described and claimed in my copending patent application Ser. No. 549,156, now U. S. Patent No. 2,835,710, filed November 25, 1955.

It is an object of this invention to provide new compositions of matter and methods for their preparation. A further object is to provide new dihydroxybifurandiones and a novel process for their preparation. A still further object is to provide a novel process for converting certain dilactones into novel dihydroxybifurandiones. Another object is to provide novel dihydroxybifurandiones which can be reacted with polyamines to yield polymeric products which are useful as film-forming components in protective and decorative coatings. Other objects will appear hereinafter.

These and other objects of this invention are accomplished by providing new dihydroxybifurandiones of the formula $C_8(OH)_2(RR')_2O_4$ wherein R and R' are hydrogen, haloaryl, alkoxyaryl or hydrocarbon radicals free from non-aromatic unsaturation. These new dihydroxybifurandiones are represented by the structural formula

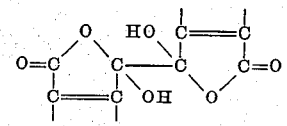

wherein the free valences of the ring carbon atoms are satisfied by hydrogen, alkoxyaryl, especially where the alkoxy group is of not more than 12 carbon atoms and the aryl radical is hydrocarbon of not more than 10 carbon atoms, haloaryl, especially where the aryl radical is hydrocarbon of not more than 10 carbon atoms and especially where the halogen is chlorine, or monovalent hydrocarbon radicals free from non-aromatic unsaturation, especially of not more than 12 carbon atoms. Thus, one free valence of each ring is satisfied by R and the other free valence of each ring is satisfied by R', said R and R' being defined as previously indicated.

This invention particularly provides the new dihydroxybifurandione, 2,2'-dihydroxy-2,2'-bifuran-5,5'(2H,2'H)-dione, which is represented by the following structural formula:

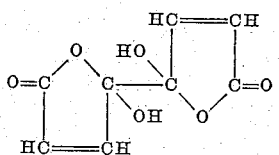

The novel dihydroxybifurandiones of this invention are obtained by oxidizing with concentrated nitric acid an unsaturated dilactone of the formula $C_8(RR')_2O_4$, wherein R and R' have the previously indicated meanings, in solution in sulfuric acid. In accordance with this invention, the new dihydroxybifurandione, 2,2'-dihydroxy-2,2'-bifuran-5,5'(2H,2'H)dione, is obtained by oxidizing with nitric acid the dilactone corresponding to $C_8H_4O_4$, i. e., $[\Delta^{2,2'(5H,5'H)}$-bifuran]-5,5'-dione in solution in sulfuric acid.

In a convenient way for preparing 2,2'-dihydroxy-2,2'-bifuran-5,5'(2H,2'H)dione, a flask equipped with stirring means is charged with a solution of $[\Delta^{2,2'(5H,5'H)}$-bifuran]-5,5'-dione in concentrated sulfuric acid and the solution is cooled in an ice bath. To the cooled solution there is added with stirring a solution of concentrated nitric acid in concentrated sulfuric acid containing at least one mole of nitric acid per mole of dilactone being oxidized. After all of the nitric acid has been added the mixture is allowed to stand with continuous stirring. It is then allowed to warm to room temperature and poured into ice water. The crystalline product which separates is removed by filtration. The product on the filter is the desired 2,2'-dihydroxy - 2,2' - bifuran-5,5'(2H,2'H)dione. It may be purified by recrystallization from methyl ethyl ketone or ethyl acetate.

The example which follows illustrates but does not limit this invention.

*Example*

To a stirred solution of 32.8 g. (0.2 mole) of the dilactone, $[\Delta^{2,2'(5H,5'H)}$-bifuran]-5,5'dione, prepared as described subsequently, in 150 ml. of sulfuric acid, cooled by an ice bath, was added a mixture of 15 ml. of concentrated nitric acid and 35 ml. of concentrated sulfuric acid over a one-hour period. The solution was stirred and allowed to come to ambient temperature during 3 hours, during which time some evolution of nitrogen tetroxide was observed. The solution was poured onto about 3 liters of ice and the almost white precipitate collected (25.1 g., 63%). It melted with darkening at 170–190° C., and after recrystallization from ethyl acetate it melted at 187–190° C. The composition and infrared spectra data indicate that it is 2,2′-dihydroxy-2,2′-bifuran-5,5′(2H,2′H)dione.

Analysis.—Calc'd for $C_8H_6O_6$: C, 48.49; H, 3.05; M. W., 198. Found: C, 48.79; H, 3.20; M. W. 212, 194.

It is probable that the oxidation proceeds as follows:

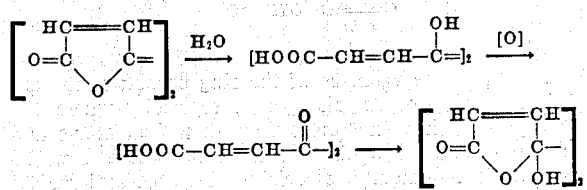

The oxygen in the above oxidation is furnished by the nitric acid and the hydroxyl by the water in the concentrated acid solution.

The compound dissolves slowly, with reaction, in 5% sodium bicarbonate, due probably to equilibrium with the open chain form, of which it is the cyclic hemiketal form.

A mixture of 2 g. of 2,2′-dihydroxy-2,2′-bifuran-5,5′(2H,2′H)dione and 25 ml. of acetic anhydride was heated on the steam bath for 6 hours, while protected from atmospheric moisture. To the contents there was added 50 ml. of ethanol and the solution evaporated almost to dryness. This operation was repeated twice and the crystals which formed were separated. The weight of crystals obtained was 0.8 g. After two recrystallizations from ethyl acetate, they melted at 185° C. The composition indicates that this is the diacetate of 2,2′-dihydroxy-2,2′-bifuran-5,5′(2H,2′H)dione.

Analysis.—Calc'd for $C_{12}H_{10}O_8$: C, 51.07; H, 3.57. Found: C, 50.68; H, 3.57.

Infrared analysis: $=C—H$ unsaturation $(3.25\mu)$, lactone carbonyl $(5.65\mu)$, $>C=C<$ $(6.15\mu)$.

A mixture of 9.9 g. of 2,2′-dihydroxy-2,2′-bifuran-5,5′(2H,2′H)dione, 5.6 g. of o-phenylenediamine, and 50 ml. of methanol was heated on a steam bath for one hour. A heavy tan colored precipitate formed immediately. The precipitate was washed by decantation with hot ethyl acetate and hot methanol. The dried, washed, precipitate weighed 7.5 g. The product reacted with 5% aqueous sodium bicarbonate. Its composition indicated that it was benzopyrazine-2,3-bis(acrylic acid).

Analysis.—Calc'd for $C_{14}H_{10}O_4N_2$: C, 62.22; H, 3.73; N, 10.37. Found: C, 63.49; H, 3.85; N, 10.80.

Small amounts of 2,2′-dihydroxy-2,2′-bifuran-5,5′(2H,-2′H)dione and hexamethylenediamine were mixed in acetone. An immediate vigorous reaction took place, giving a hard brittle, acetone-insoluble resin which is useful as the resin component in protective and decorative coatings.

In general it is desirable to control the temperature of the reaction mixture during the oxidation to below 15° C. in order to minimize degradation to four-carbon or smaller products, with consequent reduction in the yield of desired product. A convenient and practical way for effecting this control is through the use of an ice bath and by adding the oxidizing agent in solution in concentrated sulfuric acid at a controlled rate with rapid agitation.

The nitric acid employed is the concentrated acid which has a specific gravity of 1.52 to 1.54. An amount of the acid is used which is at least molar equivalent to the dilactone being oxidized.

The nitric acid is used in solution in concentrated sulfuric acid and the mixed acids are added to a solution of the dilactone in concentrated sulfuric acid at a controlled rate to maintain the temperature of the reaction mixture usually below 15° C.

The dihydroxybifurandione is soluble in the concentrated sulfuric acid reaction medium and is isolated by pouring the reaction mixture into ice, followed by filtration. The crude product thus obtained is purified by recrystallization from methyl ethyl ketone, ethyl acetate, etc.

The unsaturated dilactone $[\Delta^{2,2'(5H,5'H)}\text{-bifuran}]\text{-}5,5'$-dione used in the above examples was prepared by charging into a 400 cc. steel pressure reactor 26 g. of acetylene, 200 ml. of acetone, and 1.5 g. of dicobalt octacarbonyl. The mixture was heated with carbon monoxide at a pressure of 1000 atmospheres for 14 to 17 hours. The product was filtered and the brown solid was extracted with ethyl acetate for 24 hours. The extract was permitted to crystallize and the crystalline material was separated, and dried at room temperature. There was obtained 20 g. of the unsaturated dilactone, $C_8H_4O_4$, M. P. 229° C. after several recrystallizations from acetic acid. This dilactone exists in cis and trans isomeric forms. These two structural isomers yield suberic acid when hydrogenated with platinum in acetic acid. The normal or low melting form, 230–237° C. is the trans form and the high melting form 240–248° C. is the cis form. The formulae of these structural isomers of $[\Delta^{2,2'(5H,5'H)}\text{-bifuran}]\text{-}5,5'$-dione are as follows:

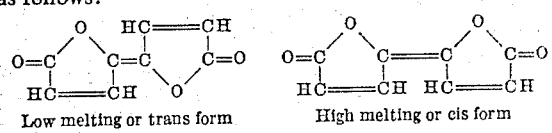

Low melting or trans form    High melting or cis form

The process of this invention is generally applicable to any of the dilactones obtained by reacting acetylene with carbon monoxide in the presence of a cobalt carbonyl catalyst, as disclosed and claimed in the copending application of J. C. Sauer, Ser. No. 549,155, now U. S. Patent No. 2,840,570, filed November 25, 1955.

The cobalt carbonyl may be made by direct reaction of carbon monoxide with the metal in active forms, as described in J. Am. Chem. Soc. 70, 383–6 (1948).

In the process of the aforementioned application there may be used any acetylene corresponding to $$R—C\equiv C—R'$$

in which R and R' are hydrogen, alkoxyaryl, especially where the alkoxy group is of not more than 12 carbon atoms and the aryl radical is hydrocarbon of not more than 10 carbon atoms, haloaryl, especially chloroaryl where the aryl radical is hydrocarbon of not more than 10 carbon atoms, or monovalent hydrocarbon radicals free from non-aromatic unsaturation, especially of not more than 12 carbon atoms, e. g., alkyl, especially short chain alkyl, i. e., containing not more than 7 carbon atoms, aryl, especially where the aryl radical is hydrocarbon of not more than 10 carbon atoms, aralkyl, especially of not more than 7 carbon atoms, or cycloalkyl, particularly of not more than 7 carbon atoms. Examples of such radicals are methyl, ethyl, octyl, decyl, dodecyl, phenyl, tolyl, xylyl, naphthyl, benzyl, cyclohexyl, methylcyclohexyl, chlorophenyl, methoxyphenyl, ethoxyphenyl, decylphenyl, dodecyloxyphenyl, dodecyloxynaphthyl, and the like. Examples of such acetylenes are acetylene, methylacetylene, 2-decyne, phenylacetylene, naphthylacetylene, p-chlorophenylacetylene, p-ethoxyphenylacetylene, naphthylacetylene, p-decyloxyacetylene, benzylacetylene, cyclohexylacetylene, methylcyclohexylacetylene, and the like.

By employing such substituted acetylenes there are obtained dilactones corresponding in molecular formula to $C_8(RR')_2O_4$ in which R and R' have the meanings previously indicated and correspond to the substituents attached to the triply bonded carbon in the acetylene reactant, i. e., R and R' in $R—C\equiv C—R'$. Thus, as shown by the aforementioned application of J. C. Sauer, there are prepared the following dilactones:

[Δ²,²'(5H,5'H)-biphenylfuran]-5,5'-dione
[Δ²,²'(5H,5'H)-bidiethylfuran]-5,5'-dione
[Δ²,²'(5H,5'H)-bi-n-butylfuran]-5,5'-dione
[Δ²,²'(5H,5'H)-bi-β-naphthylfuran]-5,5'-dione
[Δ²,²'(5H,5'H)-bichlorophenylfuran]-5,5'-dione
[Δ²,²'(5H,5'H)-bi-o-methoxyphenylfuran]-5,5'-dione and the like.

The reaction between the acetylene and carbon monoxide is carried out batchwise or continuously in the presence of an inert organic liquid medium. By "inert organic liquid medium" is meant organic liquids which contain no active hydrogen, as defined by S. Siggia in his "Quantitative Organic Analysis Via Functional Groups," 2nd ed. (1954), p. 78, chapter 6, and as determined by the Zerewitinoff method, Ber. 40, 2026 (1907); J. Am. Chem. Soc. 49, 3918 (1927). Thus the acetylene is the only compound which may contain active hydrogen. Specific reaction media are isooctane, toluene, acetonitrile, acetone, ethyl acetate, dioxane, cyclohexanone, benzene, etc.

The unsaturated dilactones employed as the starting materials in this invention can be represented by the general formula

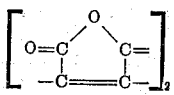

where one of the ring doubly bonded carbon atoms has its free valence satisfied by R and the other of the ring doubly bonded carbon atoms has its free valence satisfied by R', with R and R' being defined as aforesaid. These unsaturated dilactones exist in two isomeric forms which can be represented by the general formulae:

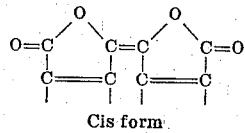
Cis form and

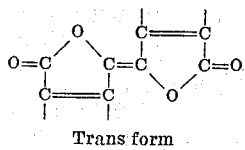
Trans form wherein one free valence of each ring is satisfied by R and the other free valence of each ring is satisfied by R', said R and R' being defined as previously indicated.

Substitution of the hereinbefore listed substituted dilactones for the dilactone of Example I in the process of Example I leads to the obtainment of the corresponding substituted 2,2'-dihydroxy-2,2'-bifuran-5,5'(2H,2'H)-diones wherein R and R' are defined as aforesaid with respect to the acetylenes, e. g., from [Δ²,²'(5H,5'H)-bidiethylfuran]-5,5'-dione there is obtained 2,2'-dihydroxy-2,2'-bidiethylfuran-5,5'(2H,2'H)dione, etc.

The dihydroxybifurandiones of this invention are readily hydrogenated with platinum or palladium catalysts to new 4,5-dioxooctanedioic and substituted 4,5-dioxooctanedioic acids. This hydrogenation is effected either in an acid or neutral medium, as is illustrated by the examples which follow:

Example A

A mixture of 25 g. (0.13 mole) of 2,2'-dihydroxy-2,2'-bifuran-5,5'(2H,2'H)dione, 350 ml. of dioxane, and 0.13 g. of platinum oxide was shaken with hydrogen at room temperature at a maximum pressure of 44 lb./sq. in. Approximately two moles of hydrogen per mole of starting material were absorbed in less than 7 hours. The filtered solution was evaporated to give 21.1 g. (83%) of crude yellow 4,5-dioxooctanedioic acid, $HOOCCH_2CH_2COCOCH_2CH_2COOH$, of which 16.4 g. was obtained in crystalline form. After two recrystallizations from ethanol the new yellow acid melted at 182–183° C. with darkening. It is quite insoluble in ethyl acetate and methyl ethyl ketone but may be recrystallized from acetic acid or water.

*Analysis.*—Calc'd for $C_8H_{10}O_6$: C, 47.53; H, 4.99; N. E., 101. Found: C, 47.66, 47.39; H, 5.18; 5.13; N. E., 100.

Ultraviolet absorption: $k_{2570}A.=0.73$.

Infrared analysis: $3.4\mu$ (saturated —CH) and $5.8\mu$ (carbonyl and/or carboxyl).

Example B

A mixture of 9.2 g. of 2,2'-dihydroxy-2,2'-bifuran-5,5'(2H,2'H)dione, 300 ml. of dioxane and 1.0 g. of 10% palladium-on-carbon was shaken with hydrogen at room temperature for one hour, during which time a pressure drop corresponding to an excess of 2 moles of hydrogen per mole was absorbed. The solution was filtered and the filtrate evaporated under nitrogen at reduced pressure. From the residue there was obtained 4.7 g. of 4,5-dioxooctanedioic acid, M. P. 180–182° C.

Example C

A mixture of 8 g. of 2,2'-dihydroxy-2,2'-bifuran-5,5'-(2H,2'H)dione, 300 ml. of acetic acid, and 0.08 g. of platinum oxide was shaken with hydrogen at room temperature for 4 hours during which time 2 moles of hydrogen per mole of dihydroxy compound was absorbed. The yellow solution was filtered and the filtrate concentrated under reduced pressure. From the residue there was obtained 5.6 g. of crude 4,5-dioxooctanedioic acid, M. P. 167–175° C., M. P. 180–182° C. after recrystallization from methyl ethyl ketone.

A solution of 0.63 g. of 4,5-dioxooctanedioic acid, prepared as above, and 0.70 g. of o-phenylenediamine in 30 ml. of ethanol was heated on a steam bath for 45 minutes. The cooled solution yielded purplish-brown crystals (0.17 g.) of benzopyrazine-2,3-bis-(propionic acid), M. P. 204–212° C. (dec.).

*Analysis.*—Calc'd for $C_{14}H_{14}O_4N_2$: C, 61.31; H, 5.15. Found: C, 61.14; H, 5.35.

Small amounts of 4,5-dioxooctanedioic acid and hexamethylenediamine were mixed in acetone and the mixture warmed on a steam bath. Upon evaporation of the acetone a hard glassy polymer which was insoluble in acetone was obtained. This polymer is useful as a protective coating.

A sealed, evacuated, tube was charged with 40 mg. of 4,5-dioxooctanedioic acid and 5 ml. of methyl methacrylate, through which nitrogen had been bubbled before sealing. Another tube was charged with similarly treated methyl methacrylate alone as a control. The tubes were irradiated side by side with ultraviolet light. After 150 minutes, the tube containing the acid was slightly more viscous than the control. After a total of 4 hours, the difference in viscosity was still slight but after standing overnight in the dark the methyl methacrylate in the tube containing the 4,5-dioxooctanedioic acid was highly viscous, showing practically no flow, while the control at that time showed appreciable flow.

The hydrogenation is effected at temperatures of 25–100° C. and pressures from atmospheric to 3000 lb./sq. in. or more. In the hydrogenation there may be used any platinum or palladium catalyst.

Thus, there can be used palladium or any of its compound, e. g., the oxide, chloride, nitrate, etc., and the catalyst can be unsupported or supported on inert base materials. Compounds of palladium appear to be more or less completely reduced to palladium metal during use. Suitable supports are charcoal, alumina, pumice, silica, etc. The particle size of the support can vary from 40–300 mesh for use in fluidized systems, whereas for use in fixed bed systems supports of larger particle size, e. g., 4–40 mesh are satisfactory.

A suitable palladium catalyst is prepared by depositing palladium chloride on granular activated coconut charcoal, in amount sufficient to give a concentration of 0.2 to 20 g. of palladium per liter of catalyst. Preferably, the charcoal is subjected to treatment with an acid, such as nitric acid, prior to contacting it with the palladium compound. A typical preparation is the following:

A solution of 8.33 g. of palladium chloride in 5.5 ml. of concentrated hydrochloric acid and 40 ml. of water is prepared by heating the mixture on a steam bath. The resulting solution is poured into a solution of 135 g. of sodium acetate trihydrate in 500 ml. of water contained in a one-liter reduction bottle. Forty-five grams of activated coconut charcoal is added and the mixture is hydrogenated until hydrogen absorption ceases, which requires between 1 and 2 hours. The catalyst is collected on a reaction filter and washed with 2 liters of water in five portions. The filter cake, after removal of most of the water, is dried in air and stored in a desiccator over calcium chloride. The catalyst which weighs from 40 to 50 g. and contains about 10% palladium, is stored, after being powdered, in a tightly closed container.

Platinum catalysts of various types known to the art can be used, for instance, metallic platinum itself, or platinum on any one of the known acid-resistant catalyst carriers. During operation platinum compounds are reduced to metallic platinum. A suitable platinum catalyst is one prepared by depositing platinum chloride on charcoal in amount sufficient to provide 10 g. of platinum per liter of catalyst. This is equivalent to 2% platinum on the charcoal.

A catalyst is prepared by dissolving a quantity of chloroplatinic acid equivalent to 1.5 g. of platinum in 150 ml. of distilled water. Coconut charcoal of 4–14 mesh size is purified by heating in a stream of hydrogen at 450° C. for approximately 20 hours, followed by heating at 100° C. in 10% nitric acid for 6 hours. The charcoal then is washed with distilled water, dried at 100° C. and the last traces of nitric acid are removed by heating the charcoal for one hour at 450° C. in a stream of nitrogen. The chloroplatinic acid solution is poured over 150 ml. of the purified charcoal and the mixture is heated on a steam bath until it is dry.

The hydrogenation is effected in solution in such media as ethyl acetate, ethanol, acetic acid, dioxane, etc. When a reaction medium is used which is reactive with carboxyl groups, the product obtained is the ester of the 4,5-dioxooctanedioic acid.

The 4,5-dioxooctanedioic acid when hydrogenated over alloy-skeleton nickel yields tetrahydro-[2,2'-bifuran]-5,5'(2H,2'H)dione, as shown below.

A pressure reactor was charged with 8.4 g. of 4,5-dioxooctanedioic acid, 5 to 10 g. of alloy-skeleton nickel, and 200 ml. of dioxane. Hydrogen was then injected so that at 100° C. the pressure was 2800 lb./sq. in. After 2.5 hours under these conditions, the reactor was allowed to cool, opened, and the contents discharged. From the reaction mixture, there was obtained 3.8 g. of tetrahydro-[2,2'-bifuran]-5,5'(2H,2'H)dione. After recrystallization from ethyl acetate and ethyl alcohol, it melted at 105° C. A mixed melting point with an authentic sample of tetrahydro-[2,2'-bifuran]-5,5'(2H,2'H)dione showed no depression of melting point.

As previously illustrated, the 2,2'-dihydroxy-2,2'-bifuran-5,5'(2H,2'H)diones of this invention react with polyamines, e. g., hexamethylenediamine, to yield polymeric products which are useful as the resin component in protective and decorative coatings. As illustrated hereinbefore, hydrogenation of the 2,2'-dihydroxy-2,2'-bifuran-5,5'-(2H,2'H)diones of this invention with either platinum or palladium yields a 4,5-dioxooctanedioic acid. The polyfunctionality of this acid makes it a very versatile chemical. Thus, it reacts with polyamines to give resinous polyamides and with such polyhydric alcohols as the glycols, e. g., ethylene glycol, to yield linear fiber-forming polyesters. These polyesters, since they contain reactive carbonyl groups, can be modified by reaction with hydrazine to form an azine.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A dihydroxybifurandione represented by the structural formula

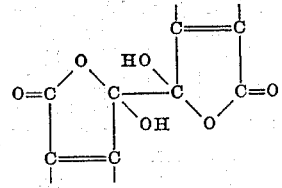

wherein one free valence of each ring is satisfied by R and the other free valence of each ring is satisfied by R', said R and R' being selected from the class consisting of hydrogen, alkoxyaryl where the alkoxy group is of not more than 12 carbon atoms and the aryl radical is hydrocarbon of not more than 10 carbon atoms, haloaryl where the aryl radical is hydrocarbon of not more than 10 carbon atoms, and monovalent hydrocarbon radicals, free from non-aromatic unsaturation, of not more than 12 carbon atoms.

2. 2,2' - dihydroxy - 2,2' - bifuran - 5,5'(2H,2'H)-dione represented by the structural formula

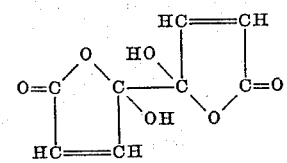

3. Process for preparing a dihydroxybifurandione as set forth in claim 1 which comprises contacting and oxidizing with concentrated nitric acid an unsaturated dilactone in solution in sulfuric acid at a temperature below 15° C., said concentrated nitric acid being in an amount which is at least molar equivalent to said unsaturated dilactone, said unsaturated dilactone being represented by one of the structural formulas selected from the class consisting of

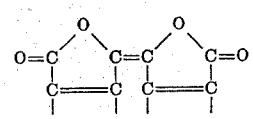

and

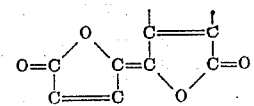

wherein one free valence of each ring is satisfied by R and the other free valence of each ring is satisfied by R', said R and R' being selected from the class consisting of hydrogen, alkoxyaryl where the alkoxy group is of not more than 12 carbon atoms and the aryl radical is hydrocarbon of not more than 10 carbon atoms, haloaryl where the aryl radical is hydrocarbon of not more than 10 carbon atoms, and monovalent hydrocarbon radicals, free from non-aromatic unsaturation, of not more than 12 carbon atoms, and isolating as the resulting product a dihydroxybifurandione as set forth in claim 1.

4. Process for preparing the dihydroxybifurandione 2,2' - dihydroxy - 2,2' - bifuran - 5,5'(2H,2'H)dione which comprises contacting and oxidizing with concentrated nitric acid the unsaturated dilactone [$\Delta^{2,2'(5H,5'H)}$-bifuran] 5,5'dione in solution in sulfuric acid at a temperature below 15° C., said concentrated nitric acid being in an amount which is at least molar equivalent to said unsaturated dilactone, and isolating as the resulting product the dihydroxybifurandione 2,2'-dihydroxy-2,2'-bifuran-5,5'(2H,2'H)dione having the structural formula

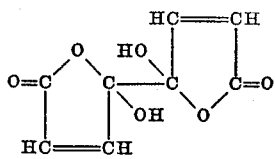

5. Process for preparing the dihydroxybifurandione as set forth in claim 4 wherein said unsaturated dilactone is contacted and oxidized with said concentrated nitric acid in mixture with concentrated sulfuric acid.

6. Process for preparing the dihydroxybifurandione as set forth in claim 4 wherein said unsaturated dilactone is contacted and oxidized with said concentrated nitric acid in mixture with concentrated sulfuric acid at a temperature between 15° C. and the temperature of an ice bath.

References Cited in the file of this patent

UNITED STATES PATENTS

| | | |
|---|---|---|
| 2,688,621 | Urban | Sept. 7, 1954 |
| 2,773,095 | Englert et al. | Dec. 4, 1956 |
| 2,809,203 | Leonard | Oct. 8, 1957 |
| 2,826,609 | Kamlet | Mar. 11, 1958 |

OTHER REFERENCES

Dufraisse et al.: Bulletin des Societes Chimique de France, vol. 1: pages 771–796 (5th series) (1934).

Wolff: Annalen der Chemie, vol. 399 (1913), pages 309–316.

Wolff: et al.: Annalen der Chimie, vol. 315 (1900–1901), pages 151–159.